United States Patent
Hsu et al.

(10) Patent No.: US 9,400,566 B2
(45) Date of Patent: Jul. 26, 2016

(54) DRIVING METHOD FOR DISPLAY PANEL

(71) Applicant: AU OPTRONICS CORP., Hsin-Chu (TW)

(72) Inventors: Wei-Chun Hsu, Hsin-Chu (TW); Yu-Hsin Ting, Hsin-Chu (TW); Wei-Chih Lee, Hsin-Chu (TW); Chung-Lin Fu, Hsin-Chu (TW); Nan-Ying Lin, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 227 days.

(21) Appl. No.: 14/062,381

(22) Filed: Oct. 24, 2013

(65) Prior Publication Data

US 2014/0347259 A1    Nov. 27, 2014

(30) Foreign Application Priority Data

May 24, 2013   (TW) .............................. 102118478 A

(51) Int. Cl.
*G09G 3/36* (2006.01)
*G06F 3/03* (2006.01)

(52) U.S. Cl.
CPC ............... *G06F 3/03* (2013.01); *G09G 3/3614* (2013.01); *G09G 3/3655* (2013.01); *G09G 2310/06* (2013.01)

(58) Field of Classification Search
CPC ........... G06F 3/03; G06F 3/041–3/047; G09G 3/3655; G09G 3/3614; G09G 2310/06
See application file for complete search history.

(56) References Cited

U.S. PATENT DOCUMENTS

| | | | |
|---|---|---|---|
| 7,580,032 B2 | 8/2009 | Jung et al. | |
| 2004/0263743 A1* | 12/2004 | Kim | G02F 1/134363 349/139 |
| 2009/0009484 A1 | 1/2009 | Yu et al. | |
| 2011/0260992 A1* | 10/2011 | Hung | G06F 3/0416 345/173 |
| 2014/0225881 A1* | 8/2014 | Takahashi | G09G 3/3614 345/209 |

FOREIGN PATENT DOCUMENTS

| | | |
|---|---|---|
| CN | 101201478 | 6/2008 |
| CN | 101339450 | 1/2009 |
| TW | I385451 | 2/2013 |

OTHER PUBLICATIONS

China Patent Office, "Office Action", Mar. 24, 2015.
"Office Action". Taiwan Patent Office. Jan. 13, 2015.

* cited by examiner

*Primary Examiner* — Matthew Sim
(74) *Attorney, Agent, or Firm* — WPAT, PC; Justin King

(57) ABSTRACT

A driving method for a display panel is provided. The display panel includes at least a first common signal line, at least a second common signal line and a plurality of pixels arranged as a pixel array. The pixel array includes a first pixel row and a second pixel row electrically connected to the first common signal line and the second common signal line, respectively. The driving method includes steps of: generating a first AC common signal; generating a second AC common signal, wherein the first AC common signal and the second AC common signal are inverse to each other; and providing the first and second AC common signal to the first and second pixel rows through the first and second common signal lines, respectively, by way of N-frame switch, wherein N is a positive integer.

15 Claims, 14 Drawing Sheets

DRIVING METHOD FOR DISPLAY PANEL

TECHNICAL FIELD

The present invention relates to a display technical field, and more particularly to a driving method for a display panel.

BACKGROUND

In recent years, with the advances in technology, large viewing angle liquid crystal display (LCD) technology has been developed rapidly due to its high brightness performance and full viewing angle characteristic.

However, the driving method for the conventional large viewing angle LCD apparatus is based on 1-frame switch manner; that is, the AC common signal for driving the display panel of the display apparatus is configured to have one level switch (e.g., from a high level to a low level or from a low level to a high level) each one frame. Because the level switch is executed every one frame, the display panel may have the Push Mura issue while being pressed by external force and the display apparatus may also have higher power consumption.

SUMMARY

Thus, the present disclosure provides a driving method for a display panel used with a display apparatus and being capable of reducing the power consumption thereof.

The present disclosure provides a driving method for a display panel. The display panel includes at least a first common signal line, at least a second common signal line and a plurality of pixels arranged as a pixel array. The pixel array includes a first pixel row and a second pixel row electrically connected to the first common signal line and the second common signal line, respectively. The driving method includes steps of: generating a first AC common signal; generating a second AC common signal, wherein the first AC common signal and the second AC common signal are inverse to each other; and providing the first and second AC common signal to the first and second pixel rows through the first and second common signal lines, respectively, by way of N-frame switch, wherein N is a positive integer.

In summary, by configuring the AC common signal to have level switch each N frames, the Push Mura issue and the higher power consumption resulted in the conventional display apparatus is avoided.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

First Embodiment

Figure 1:
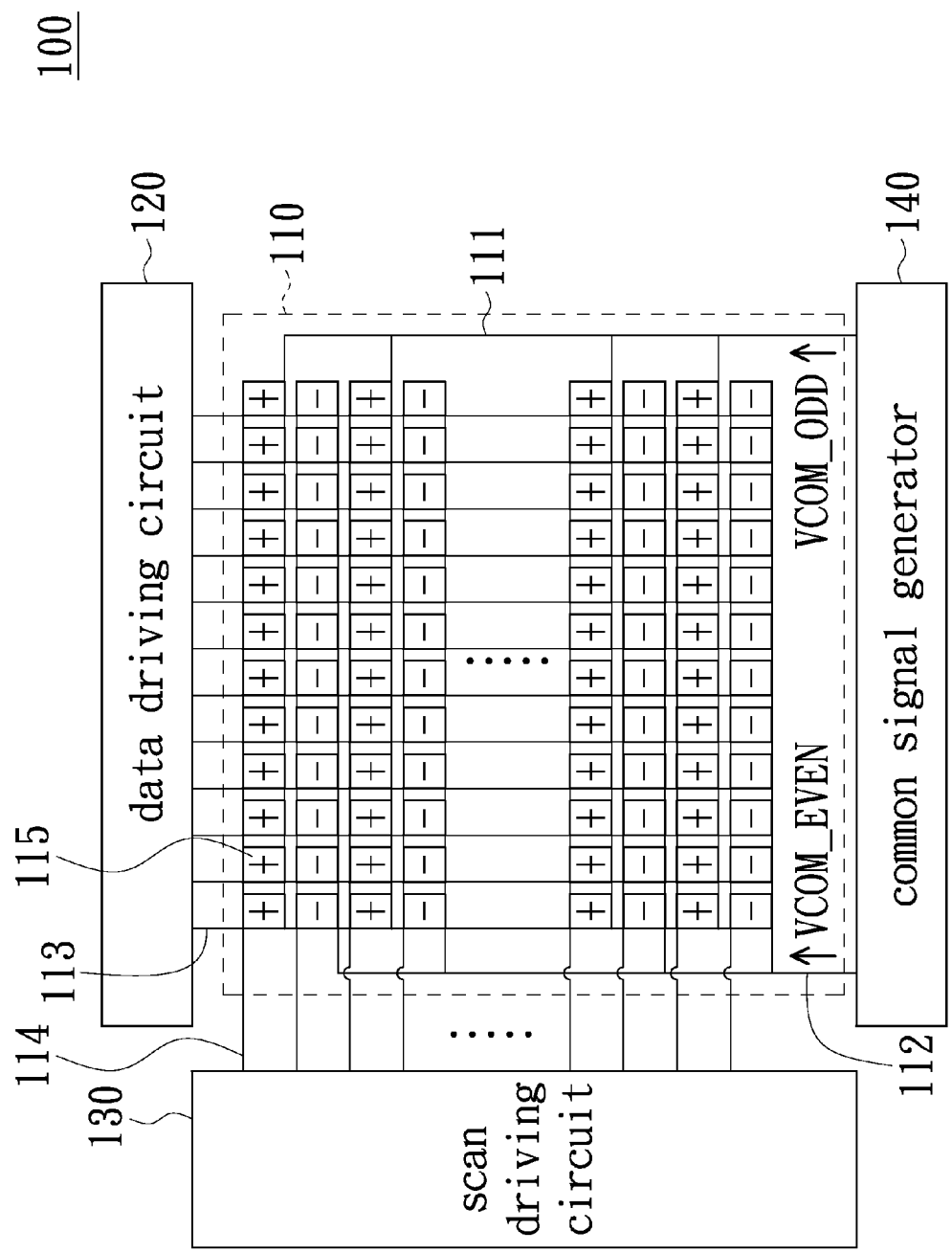
FIG. 1 is a schematic view of a display apparatus in accordance with an embodiment of the present disclosure.

FIG. 1 is a schematic view of a display apparatus in accordance with an embodiment of the present disclosure. As shown, the display apparatus 100 in this embodiment includes a display panel 110, a data driving circuit 120, a scan driving circuit 130 and a common signal generator 140. The display panel 110 includes at least one first common signal line 111, at least one second common signal line 112, a plurality of data lines 113, a plurality of scan lines 114 and a plurality of pixels 115. The pixels 115 are arranged as a pixel array, which includes a plurality of odd-numbered pixel rows (i.e., the first pixel rows) and a plurality of even-numbered pixel rows (i.e., the second pixel rows); wherein the odd-numbered pixel rows and the even-numbered pixel rows are arranged in an alternate manner and electrically connected to the first common signal line 111 and the second common signal line 112 respectively.

Specifically, the data driving circuit 120 is electrically connected to the pixels 115 through the respective data lines 113 and configured to provide respective data signals to the pixels 115. The scan driving circuit 130 is electrically connected to the pixels 115 through the respective scan lines 114 and configured to turn on the pixels 115 in a row-by-row manner. In this embodiment, the data signal provided by the data driving circuit 120 may either have a positive polarity (i.e., a first polarity) or a negative polarity (i.e., a second polarity). As illustrated in FIG. 1, specifically, while an odd-numbered pixel row is turned on by the scan driving circuit 130, a positive polarity data signal is provided from the data driving circuit 120 to each one of the pixels 115 in this turned-on odd-numbered pixel row and thereby configuring each one of the pixels 115 in this turned-on odd-numbered pixel row to have a positive polarity (i.e., the first polarity). Based on the same manner, while an even-numbered pixel row is turned on by the scan driving circuit 130, a negative polarity data signal is provided from the data driving circuit 120 to each one of the pixels 115 in this turned-on even-numbered pixel row and thereby configuring each one of the pixels 115 in this turned-on even-numbered pixel row to have a negative polarity (i.e., the second polarity). As illustrated in FIG. 1, it is to be noted that the pixels 115 in the odd-numbered pixel rows are exemplified by having an initial state of positive polarity and the pixels 115 in the even-numbered pixel rows are exemplified by having an initial state of negative polarity; however, the present disclosure is not limited thereto. For example, the pixels 115 in the odd-numbered pixel rows may be configured to have an initial state of negative polarity and the pixels 115 in the even-numbered pixel rows may be configured to have an initial state of positive polarity in another embodiment.

In addition, as illustrated in FIG. 1, the common signal generator 140 is electrically connected to the first common signal line 111 and the second common signal line 112, and through which an AC common signal VCOM_ODD and an AC common signal VCOM_EVEN are provided, respectively; wherein the common signal VCOM_ODD and the common signal VCOM_EVEN are inverse to each other. Specifically, the common signal generator 140 is further configured to provide the AC common signals VCOM_ODD and VCOM_EVEN by way of N-frame (NF) switch; wherein N is a positive integer. That is, the AC common signal VCOM_ODD has one level switch, for example, from a high level to a low level (or, from a low level to a high level) within each N frames and in the same period the AC common signal VCOM_EVEN has one level switch, for example, from a low level to a high level (or, from a high level to a low level). And correspondingly, the first common signal line 112 is configured to have a high-level signal thereon while the second common signal line 112 is configured to have a low-level signal thereon; and the first common signal line 112 is configured to have a low-level signal thereon while the second common signal line 112 is configured to have a high-level signal thereon.

Figure 2:
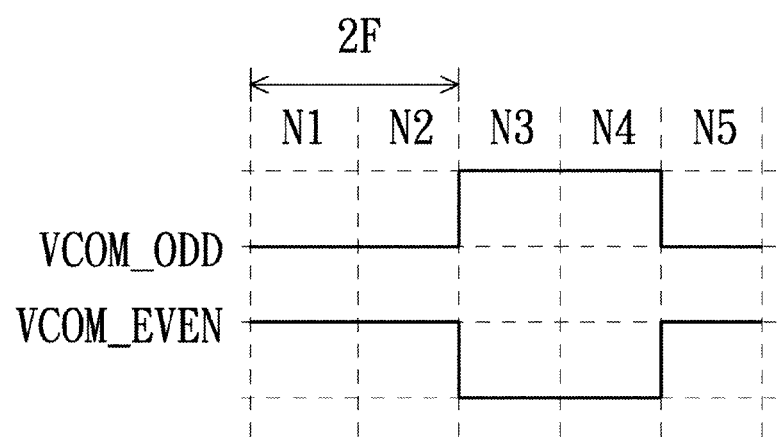
FIG. 2 is an exemplary timing sequence view of the AC common signals VCOM_ODD and VCOM_EVEN provided by the common signal generator in FIG. 1.

FIG. 2 is an exemplary timing sequence view of the AC common signals VCOM_ODD and VCOM_EVEN provided by the common signal generator 140 in FIG. 1. As shown, both of the AC common signals VCOM_ODD and VCOM_EVEN are configured to have one level switch within each two frames (2F).

Please refer to FIGS. 2 and 1. As shown, the common signal generator 140 is configured to provide the AC common signals VCOM_ODD and VCOM_EVEN by way of 2-frame (2F) switch; and accordingly, each pixel 115 has one polarity switch within each two frames (2F).

For example, in the period of the first frame N1 and the second frame N2 and while an odd-numbered pixel row is turned on by the scan driving circuit 130, the common signal generator 140 is configured to provide, through the first common signal line 111, a low-level AC common signal VCOM_ODD and the data driving circuit 120 is configured to provide, through the data lines 113, positive data signals to the pixels 115 in this turned-on odd-numbered pixel row and thereby configuring all the pixels 115 in this turned-on odd-numbered pixel row to have positive polarities. In the same period of the first frame N1 and the second frame N2 and while each pixel 115 in an even-numbered pixel row is turned on by the scan driving circuit 130, the common signal generator 140 is configured to provide, through the first common signal line 111, a high-level AC common signal VCOM_EVEN and the data driving circuit 120 is configured to provide, through the data lines 113, negative data signals to the pixels 115 in this turned-on even-numbered pixel row and thereby configuring all the pixels 115 in this turned-on even-numbered pixel row to have negative polarities.

Similarly, in the period of the third frame N3 and the fourth frame N4 and while an odd-numbered pixel row is turned on by the scan driving circuit 130, the common signal generator 140 is configured to provide, through the first common signal line 111, a high-level AC common signal VCOM_ODD and the data driving circuit 120 is configured to provide, through the data lines 113, negative data signals to the pixels 115 in this turned-on odd-numbered pixel row and thereby configuring all the pixels 115 in this turned-on odd-numbered pixel row to have negative polarities. In the same period of the third frame N3 and the fourth frame N4 and while an even-numbered pixel row is turned on by the scan driving circuit 130, the common signal generator 140 is configured to provide, through the first common signal line 111, a low-level AC common signal VCOM_EVEN and the data driving circuit 120 is configured to provide, through the data lines 113, positive data signals to the pixels 115 in this turned-on even-numbered pixel row and thereby configuring all the pixels 115 in this turned-on even-numbered pixel row to have positive polarities.

Therefore, according to aforementioned description in this embodiment, it is to be noted that only one level switch is required for both of the AC common signals VCOM_ODD and VCOM_EVEN within each two frames; consequentially, the Push Mura issue resulted by external force on the display panel is avoided and the power saving is achieved in this embodiment.

Second Embodiment

Figure 3:
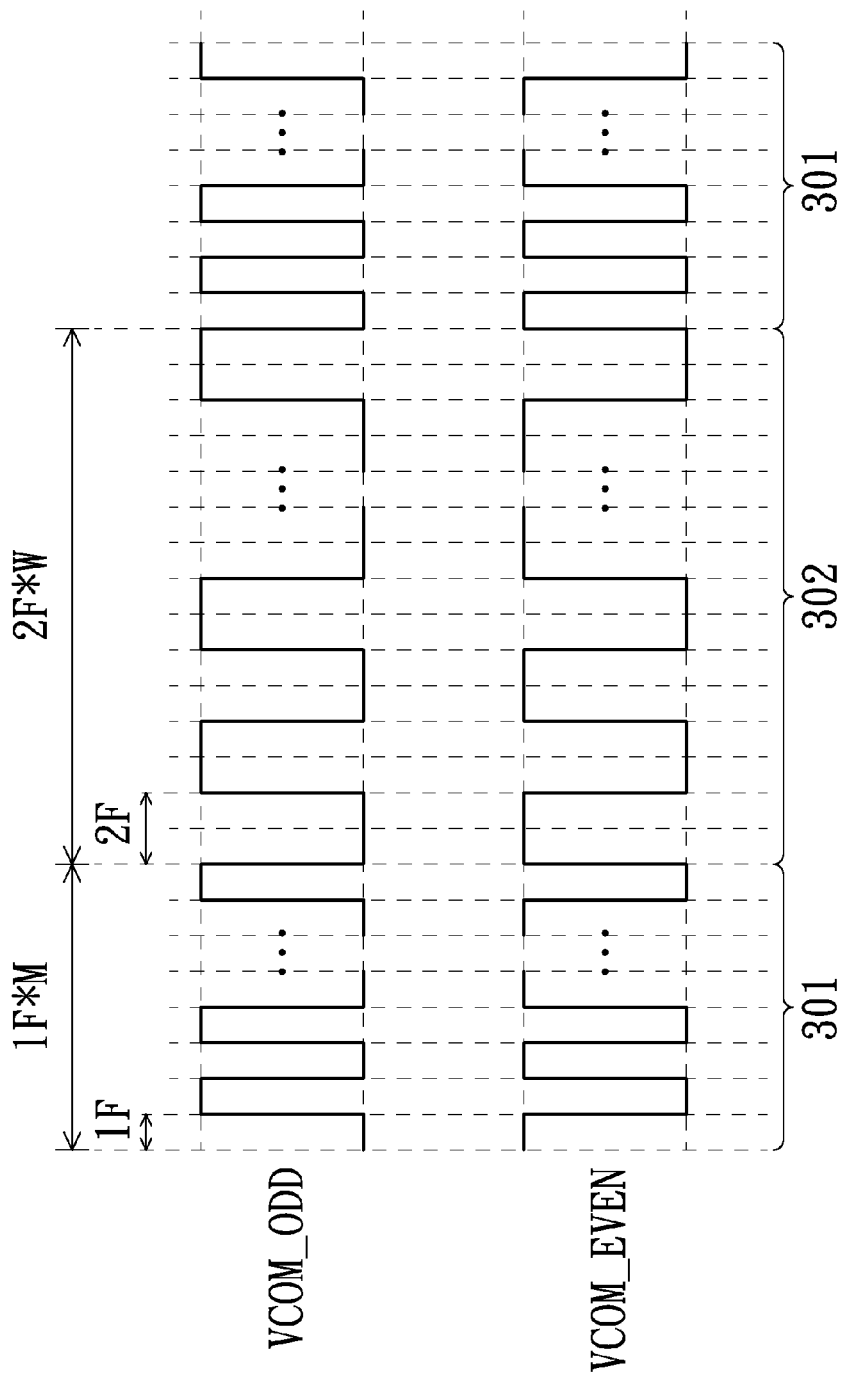
FIG. 3 is an exemplary timing sequence view of the AC common signals VCOM_ODD and VCOM_EVEN provided by the common signal generator in FIG. 1.

FIG. 3 is an exemplary timing sequence view of the AC common signals VCOM_ODD and VCOM_EVEN provided by the common signal generator 140 in FIG. 1. As shown, the timing sequence is divided into a plurality of first periods 301 and a plurality of second periods 302; wherein each first period 301 has M frames, each second period 302 has 2W frames, and M, W both are positive integers. Specifically, in the first period 301, both of the AC common signals VCOM_ODD and VCOM_EVEN have one level switch within each one frame (1F); and accordingly both of the AC common signals VCOM_ODD and VCOM_EVEN have M level switches in each first period 301. In addition, in the second period 302, both of the AC common signals VCOM_ODD and VCOM_EVEN have a level switch within each two frame (2F); and accordingly both of the AC common signals VCOM_ODD and VCOM_EVEN have W level switches in each second period 302.

Please refer to FIGS. 3 and 1. As shown, the common signal generator 140 is configured to provide the AC common signals VCOM_ODD and VCOM_EVEN by way of 1-frame (1F) switch in each first period 301; and accordingly both of the AC common signals VCOM_ODD and VCOM_EVEN have M level switches in each first period 301. Thus, by this driving manner, each pixel 115 has one polarity switch within in each one frame (1F); and accordingly each pixel 115 has M polarity switches in each first period 301. In addition, the common signal generator 140 is further configured to provide the AC common signals VCOM_ODD and VCOM_EVEN by way of 2-frame (2F) switch in each second period 302; and accordingly both of the AC common signals VCOM_ODD and VCOM_EVEN have W level switches in each second period 302. Thus, by this driving manner, each pixel 115 in the pixel array has a polarity switch within each two frames (2F); and accordingly each pixel 115 has W polarity switches in each second period 302.

Therefore, according to aforementioned description in this embodiment, it is to be noted that only one level switch is required for both of the AC common signals VCOM_ODD and VCOM_EVEN within each one frame and thereby having M level switches in the first period; and only one level switch is required for both of the AC common signals VCOM_ODD and VCOM_EVEN within each two frames and thereby having W level switches in the second period. Consequentially, the Push Mura issue resulted by external force on the display panel is avoided and the power saving is achieved in this embodiment.

Third Embodiment

Figure 4:
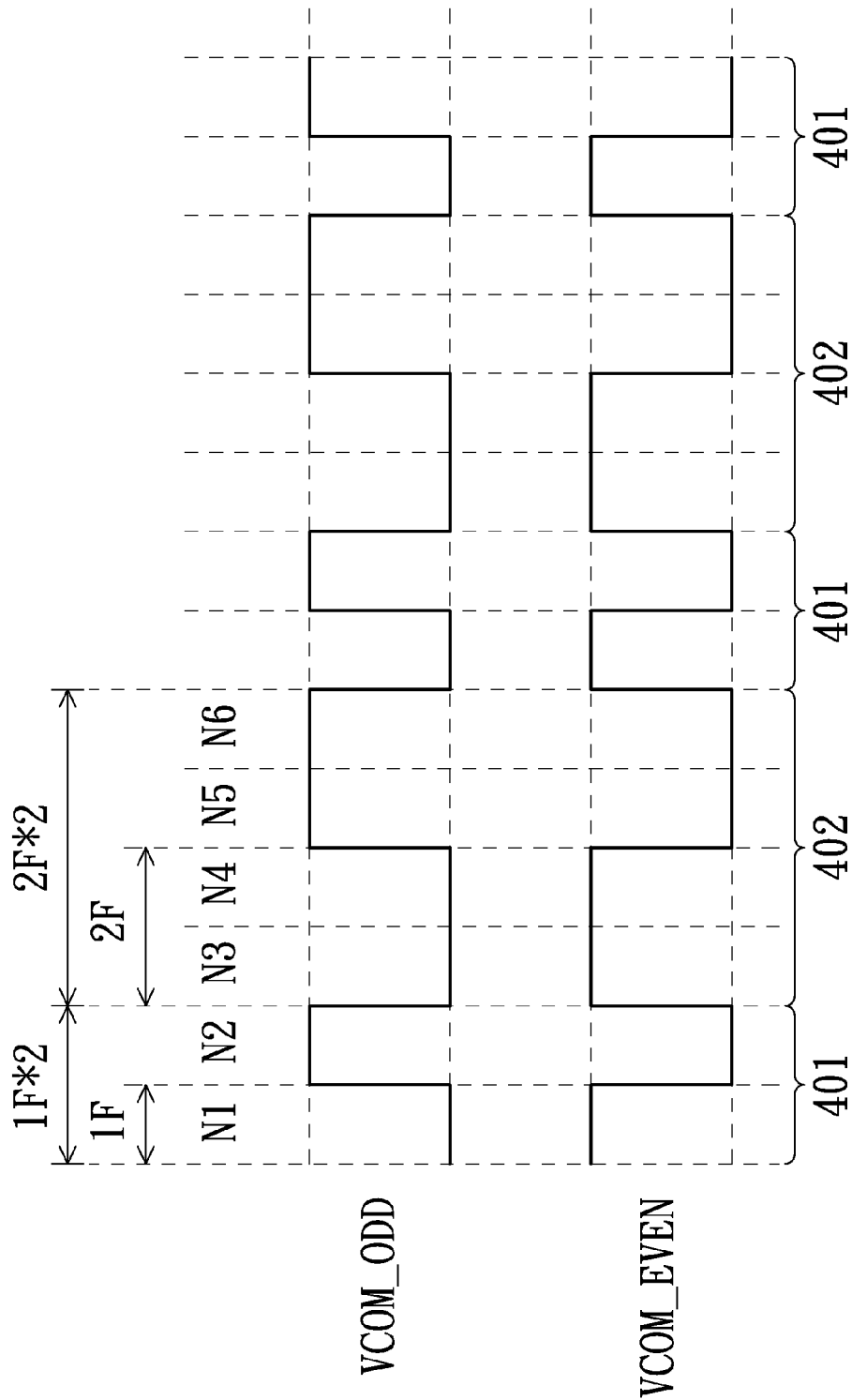
FIG. 4 is an exemplary timing sequence view of the AC common signals VCOM_ODD and VCOM_EVEN provided by the common signal generator in FIG. 1.

FIG. 4 is an exemplary timing sequence view of the AC common signals VCOM_ODD and VCOM_EVEN provided by the common signal generator 140 in FIG. 1. As shown, the timing sequence is divided into a plurality of first periods 401 and a plurality of second periods 302; wherein the first period 401 is exemplified by having two frames and the second period 402 is exemplified by having four frames. Specifically, within the first period 401, both of the AC common signals VCOM_ODD and VCOM_EVEN have one level switch within each one frame (1F); and accordingly both of the AC common signals VCOM_ODD and VCOM_EVEN have two level switches in each first period 401. In addition, in the second period 402, both of the AC common signals VCOM_ODD and VCOM_EVEN have a level switch within each two frame (2F); and accordingly both of the AC common signals VCOM_ODD and VCOM_EVEN have two level switches in each second period 402.

Please refer to FIGS. 4 and 1. As shown, the common signal generator 140 is configured to provide the AC common signals VCOM_ODD and VCOM_EVEN by way of 1-frame (1F) switch in each first period 401; and accordingly both of the AC common signals VCOM_ODD and VCOM_EVEN have two level switches in each first period 401. Thus, by this driving manner, each pixel 115 has one polarity switch within each one frame (1F); and accordingly each pixel 115 has two polarity switches in each first period 401. In addition, the common signal generator 140 is further configured to provide the AC common signals VCOM_ODD and VCOM_EVEN by way of 2-frame (2F) switch in each second period 402; and accordingly both of the AC common signals VCOM_ODD and VCOM_EVEN have two level switches in each second period 402. Thus, by this driving manner, each pixel 115 has one polarity switch within each two frames (2F); and accordingly each pixel 115 has two polarity switches in each second period 402.

For example, the first period 401 has two frames N1 and N2; and the second period 402 has four frames N3, N4, N5 and N6. In the period of the first frame N1 in the first period 401 and while an odd-numbered pixel row is turned on by the scan driving circuit 130, the common signal generator 140 is configured to provide, through the first common signal line 111, a low-level AC common signal VCOM_ODD and the data driving circuit 120 is configured to provide, through the data lines 113, positive data signals to the pixels 115 in this turned-on odd-numbered pixel row and thereby configuring all the pixels 115 in this turned-on odd-numbered pixel row to have positive polarities. In the same period of the first frame N1 in the first period 401 and while each pixel 115 in an even-numbered pixel row is turned on by the scan driving circuit 130, the common signal generator 140 is configured to provide, through the first common signal line 111, a high-level AC common signal VCOM_EVEN and the data driving circuit 120 is configured to provide, through the data lines 113, negative data signals to the pixels 115 in this turned-on even-numbered pixel row and thereby configuring all the pixels 115 in this turned-on even-numbered pixel row to have negative polarities.

Similarly, in the period of the second frame N2 in the first period 401 and while an odd-numbered pixel row is turned on by the scan driving circuit 130, the common signal generator 140 is configured to provide, through the first common signal line 111, a high-level AC common signal VCOM_ODD and the data driving circuit 120 is configured to provide, through the data lines 113, negative data signals to the pixels 115 in this turned-on odd-numbered pixel row and thereby configuring all the pixels 115 in this turned-on odd-numbered pixel row to have negative polarities. In the same period of the second frame N2 in the first period 401 and while each pixel 115 in an even-numbered pixel row is turned on by the scan driving circuit 130, the common signal generator 140 is configured to provide, through the first common signal line 111, a low-level AC common signal VCOM_EVEN and the data driving circuit 120 is configured to provide, through the data lines 113, positive data signals to the pixels 115 in this turned-on even-numbered pixel row and thereby configuring all the pixels 115 in this turned-on even-numbered pixel row to have positive polarities.

In the period of the third frame N3 and the fourth frame N4 in the second period 402 and while an odd-numbered pixel row is turned on by the scan driving circuit 130, the common signal generator 140 is configured to provide, through the first common signal line 111, a low-level AC common signal VCOM_ODD and the data driving circuit 120 is configured to provide, through the data lines 113, positive data signals to the pixels 115 in this turned-on odd-numbered pixel row and thereby configuring all the pixels 115 in this turned-on odd-numbered pixel row to have positive polarities. In the same period of the third frame N3 and the fourth frame N4 in the second period 402 and while each pixel 115 in an even-numbered pixel row is turned on by the scan driving circuit 130, the common signal generator 140 is configured to provide, through the first common signal line 111, a high-level AC common signal VCOM_EVEN and the data driving circuit 120 is configured to provide, through the data lines 113, negative data signals to the pixels 115 in this turned-on even-numbered pixel row and thereby configuring all the pixels 115 in this turned-on even-numbered pixel row to have negative polarities.

Similarly, in the period of the fifth frame N5 and the sixth frame N6 in the second period 402 and while an odd-numbered pixel row is turned on by the scan driving circuit 130, the common signal generator 140 is configured to provide, through the first common signal line 111, a high-level AC common signal VCOM_ODD and the data driving circuit 120 is configured to provide, through the data lines 113, negative data signals to the pixels 115 in this turned-on odd-numbered pixel row and thereby configuring all the pixels 115 in this turned-on odd-numbered pixel row to have negative polarities. In the same period of the fifth frame N5 and the sixth frame N6 in the second period 402 and while each pixel 115 in an even-numbered pixel row is turned on by the scan driving circuit 130, the common signal generator 140 is configured to provide, through the first common signal line 111, a low-level AC common signal VCOM_EVEN and the data driving circuit 120 is configured to provide, through the data lines 113, positive data signals to the pixels 115 in this turned-on even-numbered pixel row and thereby configuring all the pixels 115 in this turned-on even-numbered pixel row to have positive polarities.

Therefore, according to aforementioned description in this embodiment, it is to be noted that only one level switch is required for both of the AC common signals VCOM_ODD and VCOM_EVEN within each one frame and thereby having two level switches in the first period 401; and only one level switch is required for both of the AC common signals VCOM_ODD and VCOM_EVEN within each two frames and thereby having two level switches in the second period 402. Consequentially, the Push Mura issue resulted by external force on the display panel is avoided and the power saving is achieved in this embodiment.

Fourth Embodiment

Figure 5:
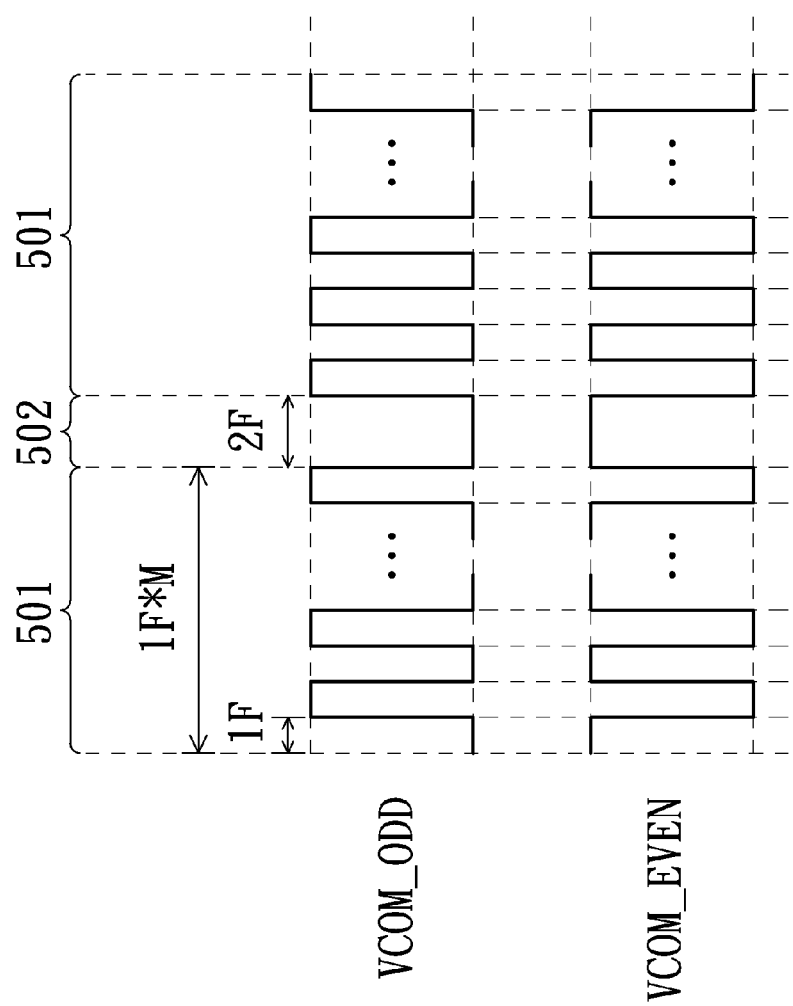
FIG. 5 is an exemplary timing sequence view of the AC common signals VCOM_ODD and VCOM_EVEN provided by the common signal generator in FIG. 1.

FIG. 5 is an exemplary timing sequence view of the AC common signals VCOM_ODD and VCOM_EVEN provided by the common signal generator 140 in FIG. 1. As shown, the timing sequence is divided into a plurality of first periods 501 and a plurality of second periods 502; wherein each first period 501 has M frames, each second period 502 has two frames, and M is a positive integer. Specifically, in the first period 501, both of the AC common signals VCOM_ODD and VCOM_EVEN have one level switch within each one frame (1F); and accordingly both of the AC common signals VCOM_ODD and VCOM_EVEN have M level switches in each first period 501. In addition, in the second period 502, both of the AC common signals VCOM_ODD and VCOM_EVEN have a level switch within each two frames (2F); and accordingly both of the AC common signals VCOM_ODD and VCOM_EVEN have one level switch in each second period 502.

Please refer to FIGS. 5 and 1. As shown, the common signal generator 140 is configured to provide the AC common signals VCOM_ODD and VCOM_EVEN by way of 1-frame (1F) switch in each first period 501; and accordingly both of the AC common signals VCOM_ODD and VCOM_EVEN have M level switches in each first period 501. Thus, by this driving manner, each pixel 115 has one polarity switch within each one frame (1F); and accordingly each pixel 115 has M polarity switches in each first period 501. In addition, the common signal generator 140 is further configured to provide the AC common signals VCOM_ODD and VCOM_EVEN by way of 2-frame (2F) switch in each second period 502; and accordingly both of the AC common signals VCOM_ODD and VCOM_EVEN have one level switch in each second period 502. Thus, by this driving manner, each pixel 115 has one polarity switch within each two frames (2F); and accordingly each pixel 115 has one polarity switch in each second period 502.

In summary, both of the AC common signals VCOM_ODD and VCOM_EVEN have one level switch within each one frame and accordingly both have M level switches in the first period; and both of the AC common signals VCOM_ODD and VCOM_EVEN have one level switch within each two frame and accordingly both have one level switch in the second period.

Therefore, according to aforementioned description in this embodiment, it is to be noted that only one level switch is required for both of the AC common signals VCOM_ODD and VCOM_EVEN within each one frame and thereby having M level switches in the first period; and only one level switch is required for both of the AC common signals VCOM_ODD and VCOM_EVEN within each two frames and thereby having one level switch in the second period. Consequentially, the Push Mura issue resulted by external force on the display panel is avoided and the power saving is achieved in this embodiment.

Fifth Embodiment

Figure 6:
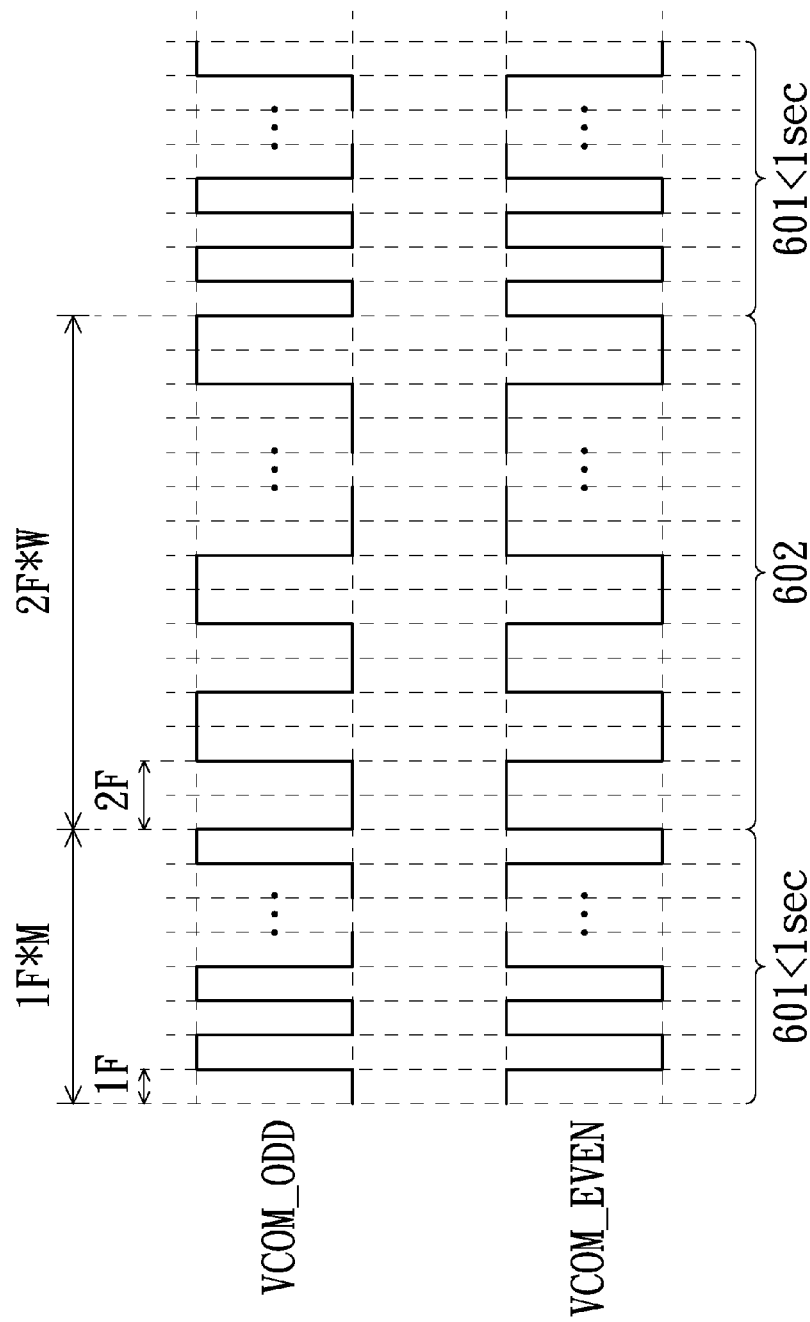
FIG. 6 is an exemplary timing sequence view of the AC common signals VCOM_ODD and VCOM_EVEN provided by the common signal generator in FIG. 1.

FIG. 6 is an exemplary timing sequence view of the AC common signals VCOM_ODD and VCOM_EVEN provided by the common signal generator 140 in FIG. 1. As shown, the timing sequence is divided into a plurality of first periods 601 and a plurality of second periods 602; wherein each first period 601 is shorter than a predetermined time (e.g., 1 second) and has M frames, each second period 602 has 2W frames, and M, W both are positive integers. Specifically, in each first period 601 (shorter than 1 second), both of the AC common signals VCOM_ODD and VCOM_EVEN have one level switch within each one frame (1F); and accordingly both of the AC common signals VCOM_ODD and VCOM_EVEN have M level switches in each first period 601. In addition, in each second period 602, both of the AC common signals VCOM_ODD and VCOM_EVEN have one level switch within each two frame (2F); and accordingly both of the AC common signals VCOM_ODD and VCOM_EVEN have W level switches in each second period 602.

Please refer to FIGS. 6 and 1. As shown, the common signal generator 140 is configured to provide the AC common signals VCOM_ODD and VCOM_EVEN by way of 1-frame (1F) switch in each first period 601 (shorter than 1 second); and accordingly both of the AC common signals VCOM_ODD and VCOM_EVEN have M level switches in each first period 601. Thus, by this driving manner, each pixel 115 has one polarity switch within each one frame (1F); and accordingly each pixel 115 has M polarity switches in each first period 601. In addition, the common signal generator 140 is further configured to provide the AC common signals VCOM_ODD and VCOM_EVEN by way of 2-frame (2F) switch in each second period 602; and accordingly both of the AC common signals VCOM_ODD and VCOM_EVEN have W level switches in each second period 602. Thus, by this driving manner, each pixel 115 has one polarity switch within each two frames (2F); and accordingly each pixel 115 has W polarity switches in each second period 602.

In summary, both of the AC common signals VCOM_ODD and VCOM_EVEN have one level switch within each one frame and accordingly both have M level switches in the first period (shorter than 1 second); and both of the AC common signals VCOM_ODD and VCOM_EVEN have one level switch within each two frame and accordingly both have one level switch in the second period.

Therefore, according to aforementioned description in this embodiment, it is to be noted that only one level switch is required for both of the AC common signals VCOM_ODD and VCOM_EVEN within each one frame and thereby having M level switches in the first period (shorter than 1 second); and only one level switch is required for both of the AC common signals VCOM_ODD and VCOM_EVEN within each two frames and thereby having W level switches in the second period. Consequentially, the Push Mura issue resulted by external force on the display panel is avoided and the power saving is achieved in this embodiment.

Sixth Embodiment

Figure 7:
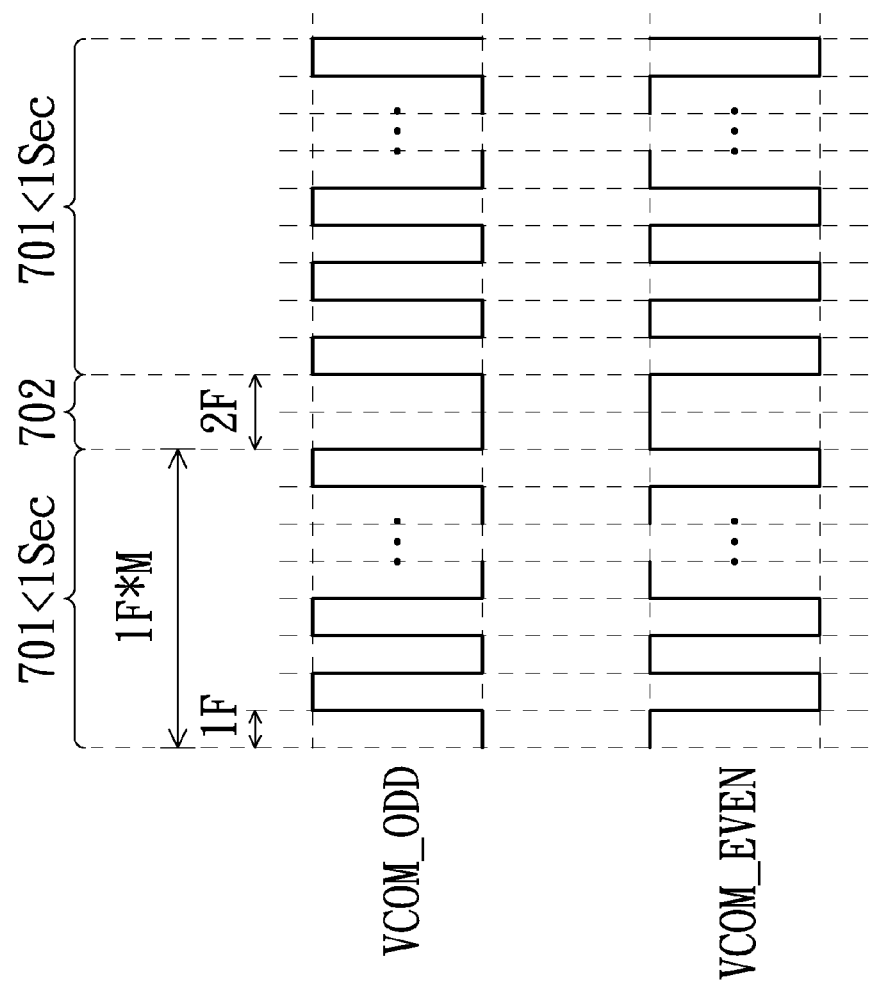
FIG. 7 is an exemplary timing sequence view of the AC common signals VCOM_ODD and VCOM_EVEN provided by the common signal generator in FIG. 1.

FIG. 7 is an exemplary timing sequence view of the AC common signals VCOM_ODD and VCOM_EVEN provided by the common signal generator 140 in FIG. 1. As shown, the timing sequence is divided into a plurality of first periods 701 and a plurality of second periods 702; wherein each first period 701 (shorter than 1 second) has M frames, each second period 702 has two frames, and M is a positive integer. Specifically, in each first period 701, both of the AC common signals VCOM_ODD and VCOM_EVEN have one level switch within each one frame (1F); and accordingly both of the AC common signals VCOM_ODD and VCOM_EVEN have M level switches in each first period 701. In addition, in each second period 702, both of the AC common signals VCOM_ODD and VCOM_EVEN have one level switch within each two frame (2F); and accordingly both of the AC common signals VCOM_ODD and VCOM_EVEN have one level switch in each second period 702.

Please refer to FIGS. 7 and 1. As shown, the common signal generator 140 is configured to provide the AC common signals VCOM_ODD and VCOM_EVEN by way of 1-frame (1F) switch in each first period 701 (shorter than 1 second); and accordingly both of the AC common signals VCOM_ODD and VCOM_EVEN have M level switches in each first period 701. Thus, by this driving manner, each pixel 115 has one polarity switch within each one frame (1F); and accordingly each pixel 115 has M polarity switches in each first period 701 (shorter than 1 second). In addition, the common signal generator 140 is further configured to provide the AC common signals VCOM_ODD and VCOM_EVEN by way of 2-frame (2F) switch in each second period 702; and accordingly both of the AC common signals VCOM_ODD and VCOM_EVEN have one level switch in each second period 702. Thus, by this driving manner, each pixel 115 has one polarity switch within each two frames (2F); and accordingly each pixel 115 has one polarity switch in each second period 702.

In summary, both of the AC common signals VCOM_ODD and VCOM_EVEN have one level switch within each one frame and accordingly both have M level switches in the first period (shorter than 1 second); and both of the AC common signals VCOM_ODD and VCOM_EVEN have one level switch within each two frame and accordingly both have one level switch in the second period.

Therefore, according to aforementioned description in this embodiment, it is to be noted that only one level switch is required for both of the AC common signals VCOM_ODD and VCOM_EVEN within each one frame and thereby having M level switches in the first period; and only one level switch is required for both of the AC common signals VCOM_ODD and VCOM_EVEN within each two frames and thereby having one level switch in the second period. Consequentially, the Push Mura issue resulted by external force on the display panel is avoided and the power saving is achieved in this embodiment.

Seventh Embodiment

Figure 8:
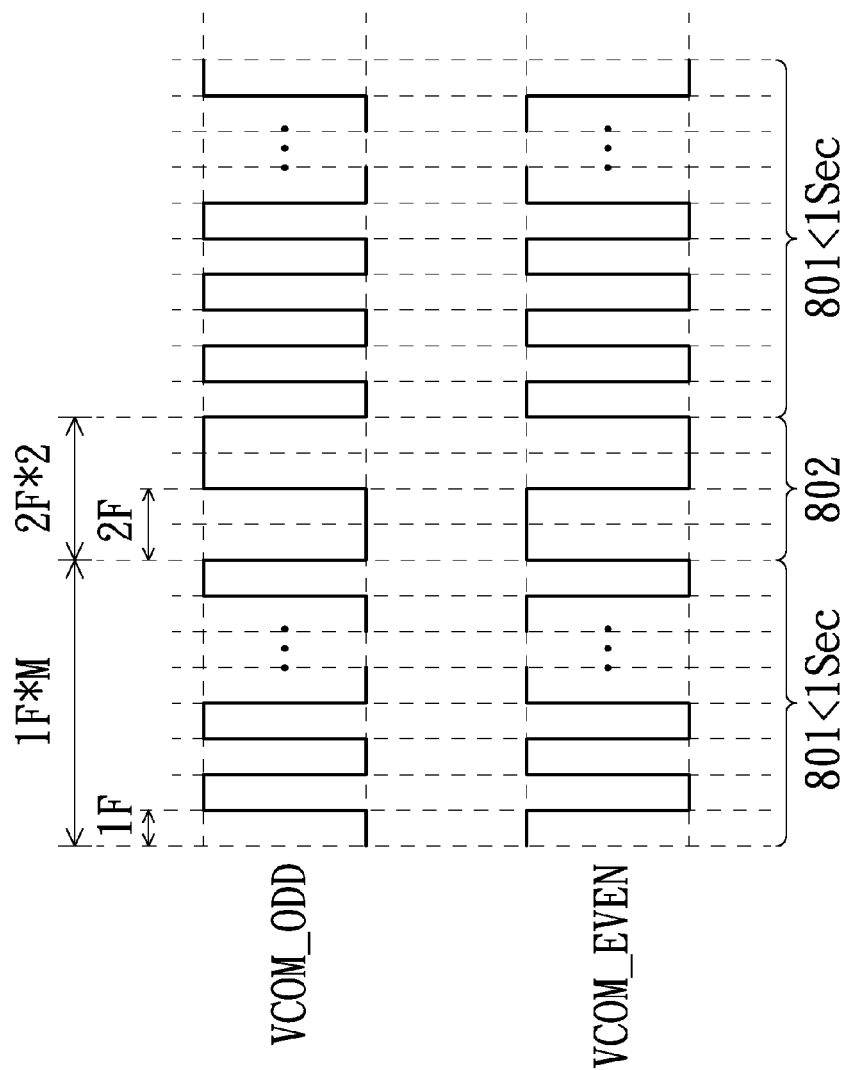
FIG. 8 is an exemplary timing sequence view of the AC common signals VCOM_ODD and VCOM_EVEN provided by the common signal generator in FIG. 1.

FIG. 8 is an exemplary timing sequence view of the AC common signals VCOM_ODD and VCOM_EVEN provided by the common signal generator 140 in FIG. 1. As shown, the timing sequence is divided into a plurality of first periods 801 and a plurality of second periods 802; wherein each first period 801 (shorter than 1 second) has M frames, each second period 802 has four frames, and M is a positive integer. Specifically, in each first period 801, both of the AC common signals VCOM_ODD and VCOM_EVEN have one level switch within each one frame (1F); and accordingly both of the AC common signals VCOM_ODD and VCOM_EVEN have M level switches in each first period 801 (shorter than 1 second). In addition, in each second period 802, both of the AC common signals VCOM_ODD and VCOM_EVEN have one level switch within each two frame (2F); and accordingly both of the AC common signals VCOM_ODD and VCOM_EVEN have two level switches in each second period 802.

Please refer to FIGS. 8 and 1. As shown, the common signal generator 140 is configured to provide the AC common signals VCOM_ODD and VCOM_EVEN by way of 1-frame (1F) switch in each first period 801 (shorter than 1 second); and accordingly both of the AC common signals VCOM_ODD and VCOM_EVEN have M level switches in each first period 801. Thus, by this driving manner, each pixel 115 has one polarity switch within each one frame (1F); and accordingly each pixel 115 has M polarity switches in each first period 801. In addition, the common signal generator 140 is further configured to provide the AC common signals VCOM_ODD and VCOM_EVEN by way of 2-frame (2F) switch in each second period 802; and accordingly both of the AC common signals VCOM_ODD and VCOM_EVEN have one level switch in each second period 802. Thus, by this driving manner, each pixel 115 has one polarity switch within each two frames (2F); and accordingly each pixel 115 has two polarity switches in each second period 802.

In summary, both of the AC common signals VCOM_ODD and VCOM_EVEN have one level switch within each one frame and accordingly both have M level switches in the first period (shorter than 1 second); and both of the AC common signals VCOM_ODD and VCOM_EVEN have one level switch within each two frame and accordingly both have two level switches in the second period.

Therefore, according to aforementioned description in this embodiment, it is to be noted that only one level switch is required for both of the AC common signals VCOM_ODD and VCOM_EVEN within each one frame and thereby having M level switches in the first period; and only one level switch is required for both of the AC common signals VCOM_ODD and VCOM_EVEN within each two frames and thereby having two level switches in the second period. Consequentially, the Push Mura issue resulted by external force on the display panel is avoided and the power saving is achieved in this embodiment.

Eighth Embodiment

Figure 9:
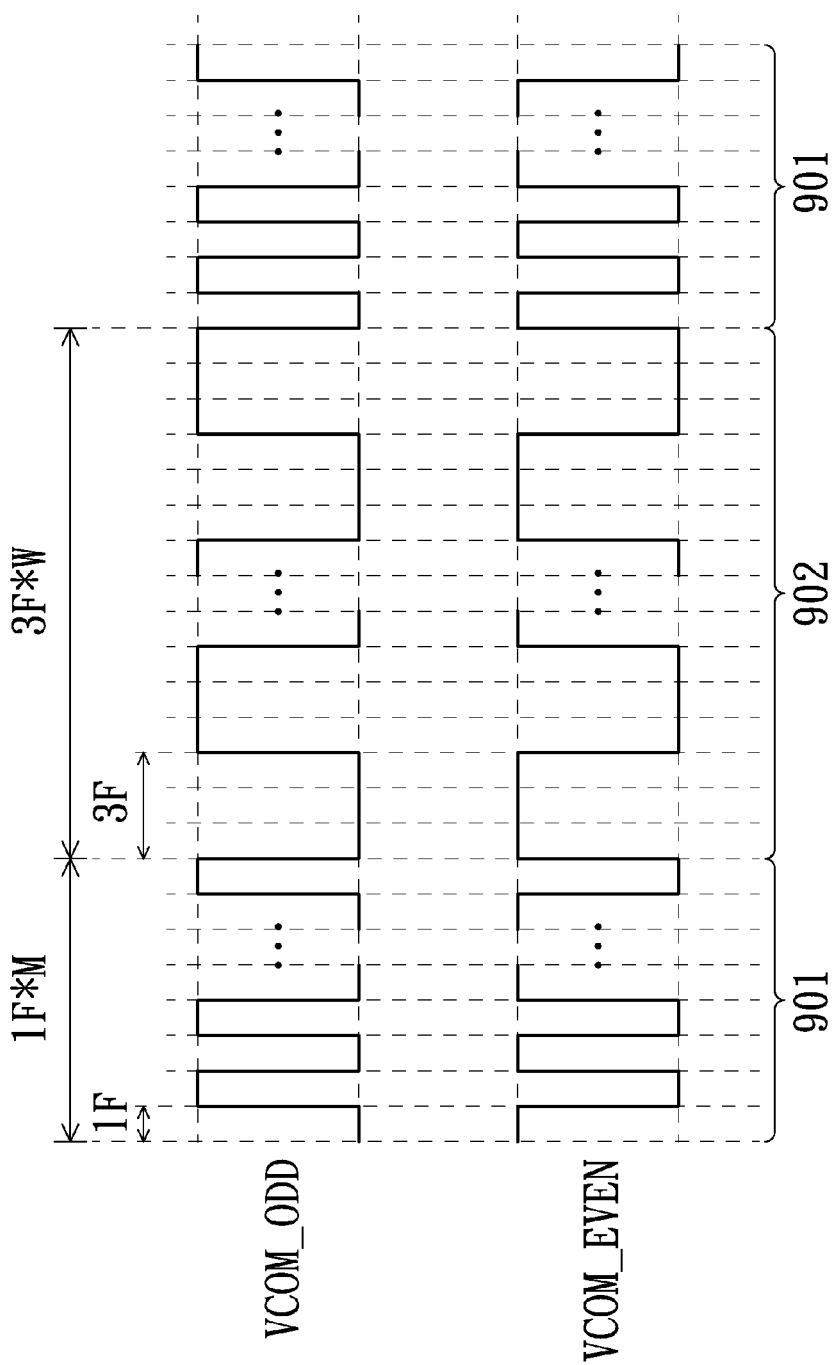
FIG. 9 is an exemplary timing sequence view of the AC common signals VCOM_ODD and VCOM_EVEN provided by the common signal generator in FIG. 1.

FIG. 9 is an exemplary timing sequence view of the AC common signals VCOM_ODD and VCOM_EVEN provided by the common signal generator 140 in FIG. 1. As shown, the timing sequence is divided into a plurality of first periods 901 and a plurality of second periods 902; wherein each first period 901 has M frames, each second period 902 has 3W frames, and M, W are positive integers. Specifically, in each first period 901, both of the AC common signals VCOM_ODD and VCOM_EVEN have one level switch within each one frame (1F); and accordingly both of the AC common signals VCOM_ODD and VCOM_EVEN have M level switches in each first period 901. In addition, in each second period 902, both of the AC common signals VCOM_ODD and VCOM_EVEN have one level switch within each three frame (3F); and accordingly both of the AC common signals VCOM_ODD and VCOM_EVEN have W level switches in each second period 902.

Please refer to FIGS. 9 and 1. As shown, the common signal generator 140 is configured to provide the AC common signals VCOM_ODD and VCOM_EVEN by way of 1-frame (1F) switch in each first period 901; and accordingly both of the AC common signals VCOM_ODD and VCOM_EVEN have M level switches in each first period 901. Thus, by this driving manner, each pixel 115 has one polarity switch within each one frame (1F); and accordingly each pixel 115 has M polarity switches in each first period 901. In addition, the common signal generator 140 is further configured to provide the AC common signals VCOM_ODD and VCOM_EVEN by way of 3-frame (3F) switch in each second period 902; and accordingly both of the AC common signals VCOM_ODD and VCOM_EVEN have W level switches in each second period 902. Thus, by this driving manner, each pixel 115 has one polarity switch within each three frames (3F); and accordingly each pixel 115 has W polarity switches in each second period 902.

In summary, both of the AC common signals VCOM_ODD and VCOM_EVEN have one level switch within each one frame and accordingly both have M level switches in the first period; and both of the AC common signals VCOM_ODD and VCOM_EVEN have one level switch within each three frame and accordingly both have W level switches in the second period.

Therefore, according to aforementioned description in this embodiment, it is to be noted that only one level switch is required for both of the AC common signals VCOM_ODD and VCOM_EVEN within each one frame and thereby having M level switches in the first period; and only one level switch is required for both of the AC common signals VCOM_ODD and VCOM_EVEN within each three frames and thereby having W level switches in the second period. Consequentially, the Push Mura issue resulted by external force on the display panel is avoided and the power saving is achieved in this embodiment.

Ninth Embodiment

Figure 10:
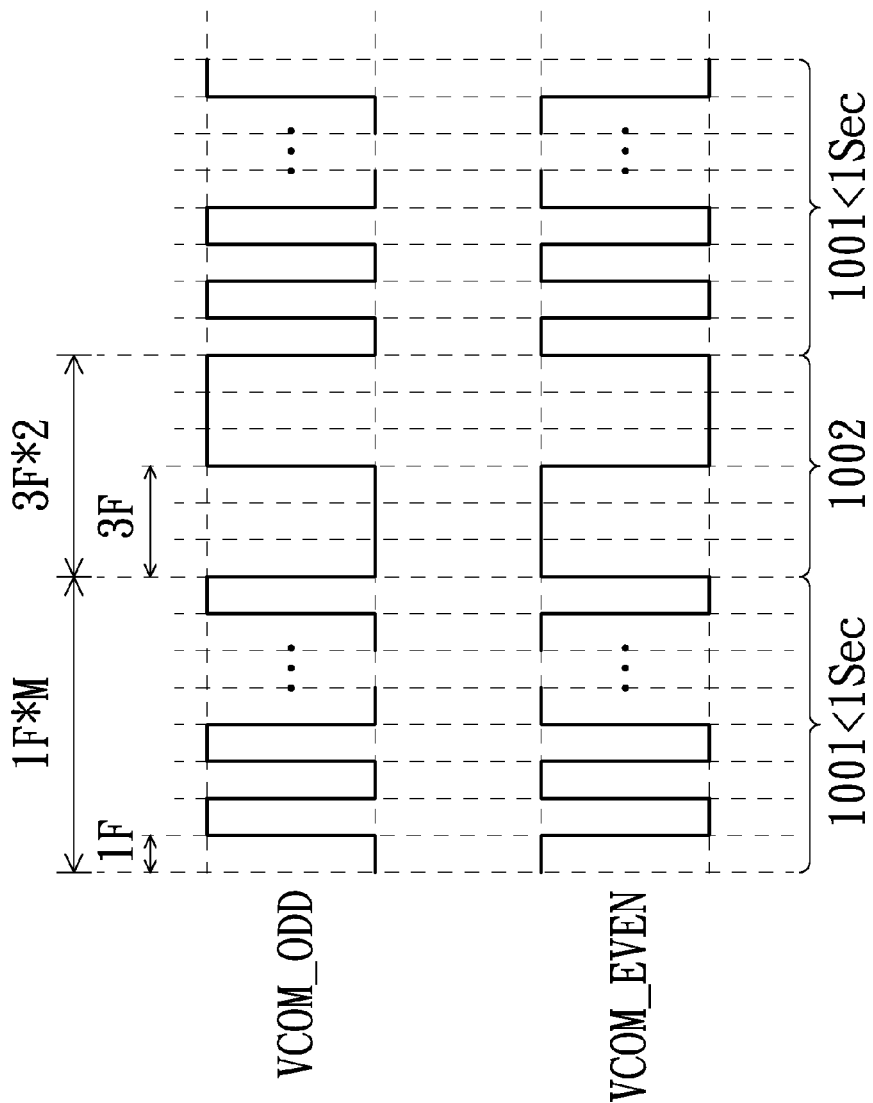
FIG. 10 is an exemplary timing sequence view of the AC common signals VCOM_ODD and VCOM_EVEN provided by the common signal generator in FIG. 1.

FIG. 10 is an exemplary timing sequence view of the AC common signals VCOM_ODD and VCOM_EVEN provided by the common signal generator 140 in FIG. 1. As shown, the timing sequence is divided into a plurality of first periods 1001 and a plurality of second periods 1002; wherein each first period 1001 is shorter than a predetermined time (e.g., 1 second) has M frames, each second period 1002 has six frames, and M is a positive integer. Specifically, in each first period 1001, both of the AC common signals VCOM_ODD and VCOM_EVEN have one level switch within each one frame (1F); and accordingly both of the AC common signals VCOM_ODD and VCOM_EVEN have M level switches in each first period 1001 (shorter than 1 second). In addition, in each second period 1002, both of the AC common signals VCOM_ODD and VCOM_EVEN have one level switch within each three frame (3F); and accordingly both of the AC common signals VCOM_ODD and VCOM_EVEN have two level switches in each second period 1002.

Please refer to FIGS. 10 and 1. As shown, the common signal generator 140 is configured to provide the AC common signals VCOM_ODD and VCOM_EVEN by way of 1-frame (1F) switch in each first period 1001 (shorter than 1 second); and accordingly both of the AC common signals VCOM_ODD and VCOM_EVEN have M level switches in each first period 1001. Thus, by this driving manner, each pixel 115 has one polarity switch within each one frame (1F); and accordingly each pixel 115 has M polarity switches in each first period 1001 (shorter than 1 second). In addition, the common signal generator 140 is further configured to provide the AC common signals VCOM_ODD and VCOM_EVEN by way of 3-frame (3F) switch in each second period 1002; and accordingly both of the AC common signals VCOM_ODD and VCOM_EVEN have two level switches in each second period 1002. Thus, by this driving manner, each pixel 115 has one polarity switch within each three frames (3F); and accordingly each pixel 115 has two polarity switches in each second period 1002.

In summary, both of the AC common signals VCOM_ODD and VCOM_EVEN have one level switch within each one frame and accordingly both have M level switches in the first period (shorter than 1 second); and both of the AC common signals VCOM_ODD and VCOM_EVEN have one level switch within each three frame and accordingly both have two level switches in the second period.

Therefore, according to aforementioned description in this embodiment, it is to be noted that only one level switch is required for both of the AC common signals VCOM_ODD and VCOM_EVEN within each one frame and thereby having M level switches in the first period (shorter than 1 second); and only one level switch is required for both of the AC common signals VCOM_ODD and VCOM_EVEN within each three frames and thereby having two level switches in the second period. Consequentially, the Push Mura issue resulted by external force on the display panel is avoided and the power saving is achieved in this embodiment.

Tenth Embodiment

Figure 11:
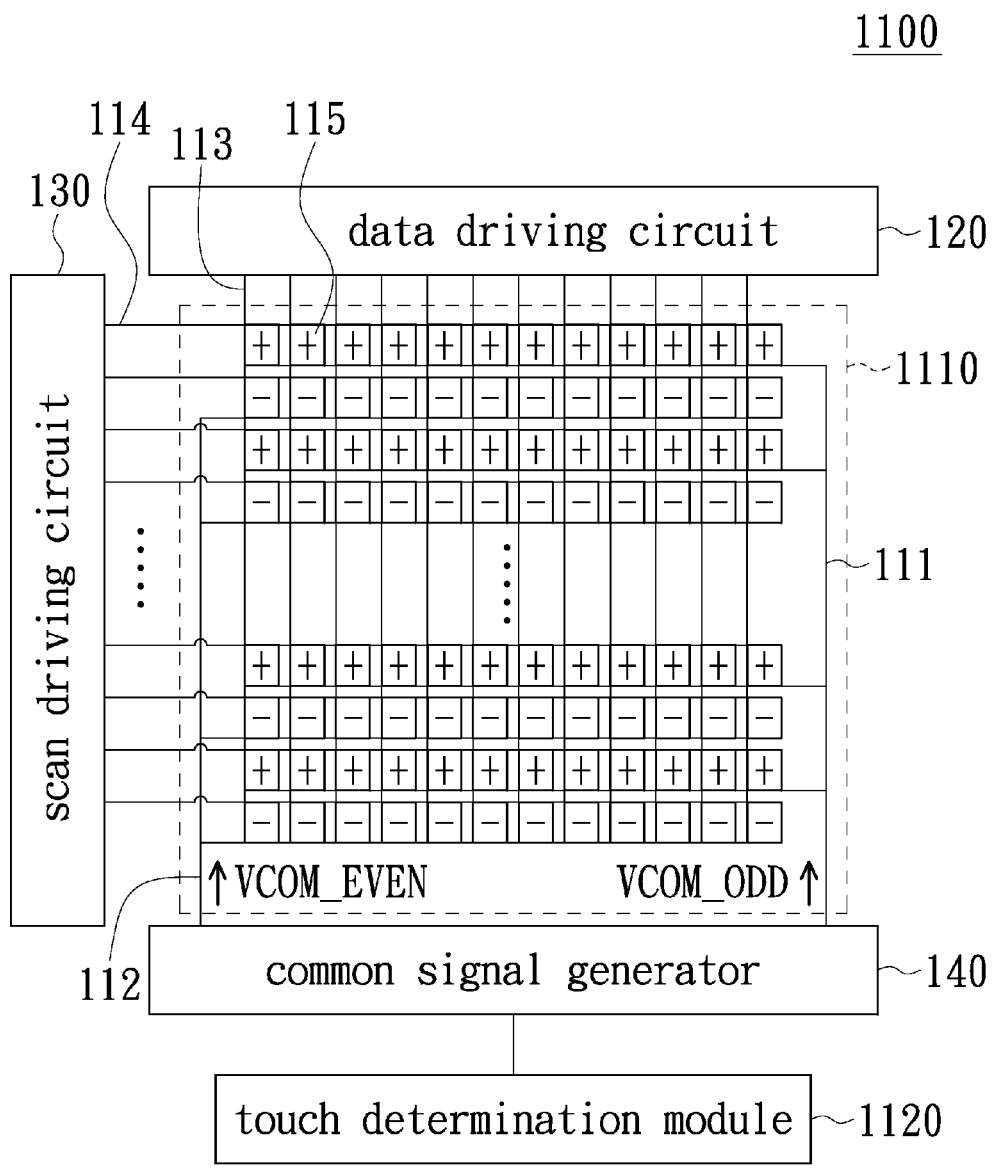
FIG. 11 is a schematic view of a display apparatus in accordance with another embodiment of the present disclosure.

FIG. 11 is a schematic view of a display apparatus in accordance with another embodiment of the present disclosure. As shown, the display apparatus 1100 in this embodiment is similar to the display apparatus 100 in FIG. 1; the main difference between the two is that the display panel of the display apparatus 1100 in this embodiment is realized by a touch panel 1110. Moreover, the display apparatus 1100 in this embodiment further includes a touch determination module 1120, which is electrically connected to the common signal generator 140 and configured to determine whether the touch panel 1110 is in a non-touch period, a touch period or a touch-end period. Specifically, when touch panel 1110 is in the touch-end period, the touch determination module 1120 issues a touch-end signal to the common signal generator 140 thereby configuring the common signal generator 140 to have a level switch operation on the AC common signals VCOM_ODD VCOM_EVEN on the first common signal line 111 and the second common signal line 112, respectively. The level switch on the AC common signals VCOM_ODD VCOM_EVEN will be described in detail in FIGS. 12A and 12B.

Figure 12A:
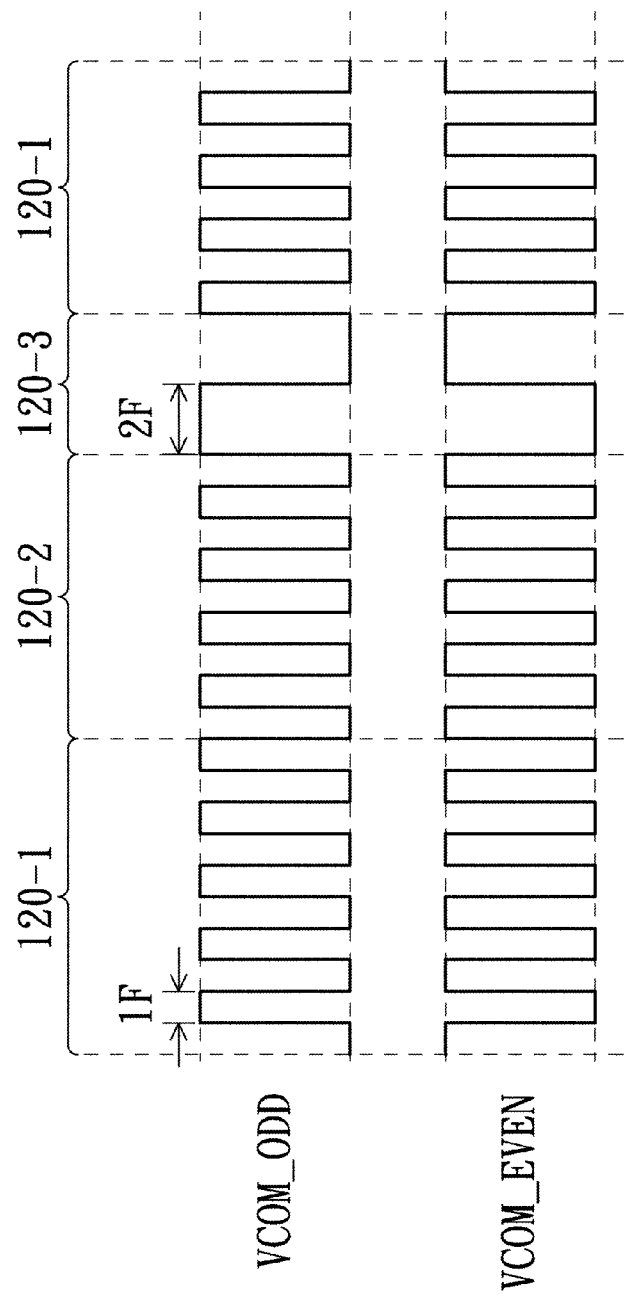
FIG. 12A is an exemplary timing sequence view of the AC common signals VCOM_ODD and VCOM_EVEN.
Figure 12B:
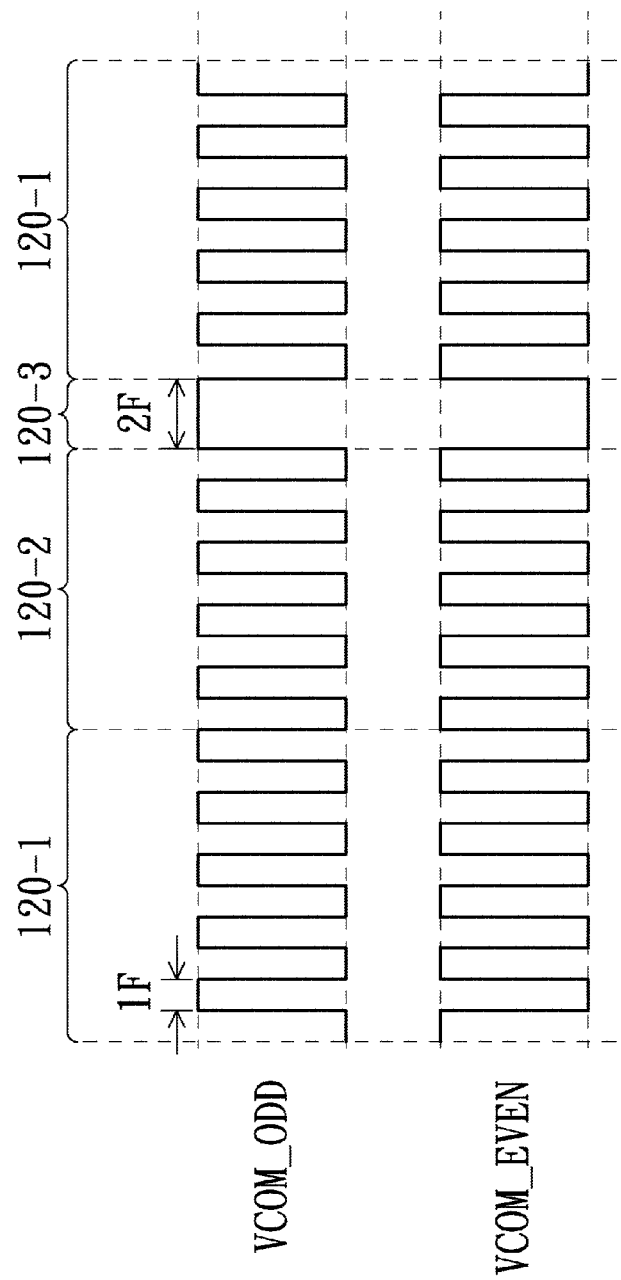
FIG. 12B is an exemplary timing sequence view of the AC common signals VCOM_ODD and VCOM_EVEN.

FIGS. 12A, 12B are exemplary timing sequence views of the AC common signals VCOM_ODD and VCOM_EVEN provided by the common signal generator 140 in FIG. 10. As shown, the timing sequences are divided into a plurality of non-touch periods 120-1, a plurality of touch periods 120-2 and a plurality of touch-end periods 120-3.

As shown in FIG. 12A, in each non-touch period 120-1 and touch period 120-2, both of the AC common signals VCOM_ODD and VCOM_EVEN have one level switch within each one frame (1F). In each touch-end period 120-3, both of the AC common signals VCOM_ODD and VCOM_EVEN have one level switch within each two frames (2F), and accordingly both of the AC common signals VCOM_ODD and VCOM_EVEN have two level switches in each touch-end period 120-3 if the touch-end period 120-3 has four frames.

Please refer to FIGS. 12A and 11. As shown, when the touch determination module 1120 determines that the touch panel 1110 is in the non-touch period 120-1 or in the touch period 120-2, the common signal generator 140 is configured to provide the AC common signals VCOM_ODD and VCOM_EVEN by way of 1-frame (1F) switch. Thus, by this driving manner, each pixel 115 has one polarity switch within each one frame (1F).

Alternatively, when the touch determination module 1120 determines that the touch panel 1110 is in the touch-end period 120-3, the common signal generator 140 is configured to provide the AC common signals VCOM_ODD and VCOM_EVEN by way of 2-frame (2F) switch. Thus, by this driving manner, each pixel 115 has one polarity switch within each two frames (2F) and accordingly each pixel 115 has two polarity switches in each touch-end period 120-3.

As shown in FIG. 12B, in each non-touch period 120-1 and touch period 120-2, both of the AC common signals VCOM_ODD and VCOM_EVEN have one level switch within each one frame (1F). In each touch-end period 120-3, both of the AC common signals VCOM_ODD and VCOM_EVEN have one level switch within each two frames (2F), and accordingly both of the AC common signals VCOM_ODD and VCOM_EVEN have one level switch in each touch-end period 120-3 if the touch-end period 120-3 has two frames.

Please refer to FIGS. 12B and 11. As shown, when the touch determination module 1120 determines that the touch panel 1110 is in the non-touch period 120-1 or in the touch period 120-2, the common signal generator 140 is configured to provide the AC common signals VCOM_ODD and VCOM_EVEN by way of 1-frame (1F) switch. Thus, by this driving manner, each pixel 115 has one polarity switch within each one frame (1F).

Alternatively, when the touch determination module 1120 determines that the touch panel 1110 is in the touch-end period 120-3, the common signal generator 140 is configured to provide the AC common signals VCOM_ODD and VCOM_EVEN by way of 2-frame (2F) switch. Thus, by this driving manner, each pixel 115 has one polarity switch within each two frames (2F) and accordingly each pixel 115 has one polarity switch in each touch-end period 120-3.

Figure 13:
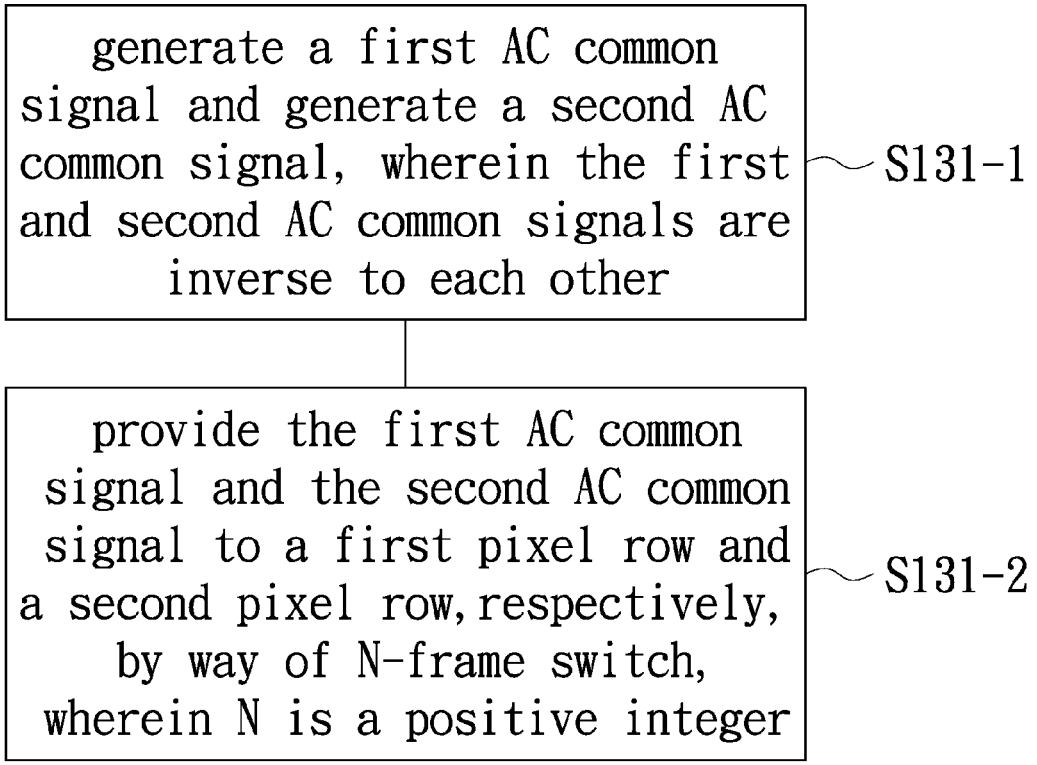
FIG. 13 is a flowchart illustrating a driving method for a display panel in accordance with an embodiment of the present disclosure.

According to the descriptions in the aforementioned embodiments, the display apparatus can be summarized to have a driving method as illustrated in FIG. 13, which is a flowchart illustrating a driving method for a display panel according to an embodiment of the present invention. As shown, the driving method includes steps of: generating a first AC common signal and generating a second AC common signal, wherein the first and second AC common signals are inverse to each other (step S131-1); and providing the first AC common signal and the second AC common signal to a first pixel row and a second pixel row, respectively, by way of N-frame switch, wherein N is a positive integer (step S131-3).

In summary, by configuring the AC common signal to have level switch each N frames, the Push Mura issue and the higher power consumption resulted in the conventional display apparatus is avoided.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A driving method for a display panel, the display panel being a touch panel, having a fixed refresh rate, and comprising at least a first common signal line, at least a second common signal line and a plurality of pixels arranged as a pixel array, the pixel array comprising a first pixel row and a second pixel row electrically connected to the first common signal line and the second common signal line, respectively, all pixels of the first pixel row and the second pixel row being connected to a first scan line and a second scan line respectively, the driving method comprising:
generating a first AC common signal;
generating a second AC common signal, wherein the first AC common signal and the second AC common signal are inverse to each other;
providing the first and second AC common signals to all pixels of the first and second pixel rows through the first and second common signal lines, respectively, wherein one of the first and second AC common signals is configured to have one level switch within each N-frame switch, wherein the pulse width of the AC common signal enabling period of the N-frame switch is equal to the N times of the pulse width of the AC common signal enabling period of the 1-frame switch, and the first and second pixel rows have one polarity switch within each N-frame in accordance with the first and second AC common signals, and N is equal to or greater than two; and
when the touch operation of the display panel is ended, changing from providing the first and second AC common signals by way of 1-frame switch to providing the first and second AC common signals by way of N-frame switch.

2. The driving method according to claim 1, wherein N is 2, and the first and second AC common signals are provided by way of 2-frame switch.

3. The driving method according to claim 1, wherein in a first period and N is 1, the first and second AC common signals are provided by way of 1-frame switch and both of the first and second AC common signals have M level switches in the first period, wherein in a second period and N is 2, the first and second AC common signals are provided by way of 2-frame switch and both of the first and second AC common signals have W level switches in the second period, wherein M, W are positive integers.

4. The driving method according to claim 3, wherein in the first period and N is 1, the first and second AC common signals are provided by way of 1-frame switch and both of the first and second AC common signals have two level switches in the first period, wherein in the second period and N is 2, the first and second AC common signals are provided by way of 2-frame switch and both of the first and second AC common signals have two level switches in the second period.

5. The driving method according to claim 3, wherein in the second period and N is 2, the first and second AC common signals are provided by way of 2-frame switch and both of the first and second AC common signals have one level switch in the second period.

6. The driving method according to claim 3, wherein the first period is shorter than a predetermined time.

7. The driving method according to claim 6, wherein in the second period and N is 2, the first and second AC common signals are provided by way of 2-frame switch and both of the first and second AC common signals have one level switch in the second period.

8. The driving method according to claim 6, wherein in the second period and N is 2, the first and second AC common signals are provided by way of 2-frame switch and both of the first and second AC common signals have two level switches in the second period.

9. The driving method according to claim 8, wherein the first period is shorter than a predetermined time.

10. The driving method according to claim 9, wherein in the second period and N is 3, the first and second AC common signals are provided by way of 3-frame switch and both of the first and second AC common signals have two level switches in the second period.

11. The driving method according to claim 1, wherein in a first period and N is 1, the first and second AC common signals are provided by way of 1-frame switch and both of the first and second AC common signals have M level switches in the first period, wherein in a second period and the N is 3, the first and second AC common signals are provided by way of 3-frame switch and both of the first and second AC common signals have W level switches in the second period, wherein M, W are positive integers.

12. The driving method according to claim 1, wherein a touch determination module is configured to determine whether the touch panel is in a non-touch period, a touch period or a touch-end period, the touch determination module is further configured to issues a touch-end signal when the touch panel is in the touch-end period.

13. The driving method according to claim 12, wherein when the touch panel is in the non-touch period or the touch period, the driving method further comprises: providing the first and second AC common signals by way of 1-frame switch.

14. The driving method according to claim 12, wherein when the touch panel is in the touch-end period, the driving method further comprises: providing the first and second AC common signals by way of 2-frame switch according to the touch-end signal and both of the first and second AC common signals having two level switches.

15. The driving method according to claim 12, wherein when the touch panel is in the touch-end period, the driving method further comprises: providing the first and second AC common signals by way of 2-frame switch according to the touch-end signal and both of the first and second AC common signals having one level switch.

* * * * *